US012137270B2

(12) United States Patent
Choi et al.

(10) Patent No.: US 12,137,270 B2
(45) Date of Patent: Nov. 5, 2024

(54) BROADCAST RECEIVING APPARATUS AND OPERATING METHOD THEREOF

(71) Applicant: LG ELECTRONICS INC., Seoul (KR)

(72) Inventors: Jongsung Choi, Seoul (KR); Soonkyo Lee, Seoul (KR); Jungho Kwak, Seoul (KR); Hojun Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 31 days.

(21) Appl. No.: 17/927,659

(22) PCT Filed: May 26, 2020

(86) PCT No.: PCT/KR2020/006795
§ 371 (c)(1),
(2) Date: Nov. 23, 2022

(87) PCT Pub. No.: WO2021/241773
PCT Pub. Date: Dec. 2, 2021

(65) Prior Publication Data
US 2023/0217072 A1    Jul. 6, 2023

(51) Int. Cl.
*H04N 21/438*    (2011.01)
*H04N 21/442*    (2011.01)
(Continued)

(52) U.S. Cl.
CPC ....... *H04N 21/4516* (2013.01); *H04N 21/485* (2013.01); *H04N 21/4882* (2013.01); *H04N 21/8173* (2013.01)

(58) Field of Classification Search
CPC .................................................. H04N 21/4586
See application file for complete search history.

(56) References Cited

U.S. PATENT DOCUMENTS

| 11,032,619 | B2* | 6/2021 | Kim ...................... H04N 21/482 |
| 2009/0112944 | A1* | 4/2009 | Zhang ................ H04N 21/6581 |
|  |  |  | 707/999.203 |

(Continued)

FOREIGN PATENT DOCUMENTS

| EP | 2373008 | 10/2011 |
| EP | 2590425 | 5/2013 |

(Continued)

OTHER PUBLICATIONS

PCT International Application No. PCT/KR2020/006795, International Search Report dated Feb. 22, 2021, 3 pages.
European Patent Office Application Serial No. 20938105.2, Search Report dated Jan. 16, 2024, 7 pages.

*Primary Examiner* — Hsiungfei Peng
(74) *Attorney, Agent, or Firm* — LEE, HONG, DEGERMAN, KANG & WAIMEY

(57) ABSTRACT

The present disclosure relates to a broadcast receiving apparatus and an operating method thereof. The broadcast receiving apparatus according to an embodiment of the present disclosure includes a network interface unit configured to communicate with an external server through a network; a broadcast receiving unit configured to receive a broadcast signal; a storage unit configured to store a database containing information on at least one broadcasting service provider; and a controller, wherein the controller checks whether access to the network is possible through the network interface unit, checks, when the access to the network is possible, a status of an application, which is registered in an application server, that contains information on a broadcasting service provider, through the network interface unit, determines whether it is required to update at least some of information contained in the database, based on a result of checking the status of the application, receives, when the update is required, an application containing information required for the update from the application (Continued)

server, updates at least some of the information contained in the database, based on the received application, and receives the broadcast signal based on the information contained in the database through the broadcast receiving unit. Various other embodiments are possible.

14 Claims, 11 Drawing Sheets

(51) Int. Cl.
*H04N 21/45* (2011.01)
*H04N 21/458* (2011.01)
*H04N 21/485* (2011.01)
*H04N 21/488* (2011.01)
*H04N 21/81* (2011.01)

(56) References Cited

U.S. PATENT DOCUMENTS

2010/0281108 A1* 11/2010 Cohen .................. H04N 21/458
  709/203
2016/0171890 A1* 6/2016 Galli .................... G01S 7/52004
  367/93

FOREIGN PATENT DOCUMENTS

| KR | 10-2007-0093281 | 9/2007 |
| KR | 10-2008-0063719 | 7/2008 |
| KR | 10-2008-0063961 | 7/2008 |
| KR | 10-2017-0022612 | 3/2017 |
| WO | 2014-144851 | 9/2014 |

* cited by examiner

BROADCAST RECEIVING APPARATUS AND OPERATING METHOD THEREOF

CROSS-REFERENCE TO RELATED APPLICATIONS

This application is the National Stage filing under 35 U.S.C. 371 of International Application No. PCT/KR2020/006795, filed on May 26, 2020, the contents of which are all incorporated by reference herein in their entirety.

TECHNICAL FIELD

The present disclosure relates to a broadcast receiving apparatus and an operating method thereof.

BACKGROUND ART

An image display apparatus is a device having a function of displaying an image that a user can watch, and a user can watch a broadcast through the image display apparatus. For example, the image display apparatus may include a Television (TV), a monitor, a projector, and the like that have a liquid crystal display LCD using a liquid crystal or an OLED display using an organic light emitting diode OLED.

Recently, a digital TV service using a wired or wireless network communication network has become common, and the digital TV service provides various services that cannot be provided by an existing analog broadcasting service. Here, the digital TV service may include not only digital terrestrial broadcasting, but also digital cable broadcasting, digital satellite broadcasting, IP-TV service, terrestrial and satellite DMB service, VOD service provided through a communication network, and the like.

The image display apparatus displays a broadcast screen based on a broadcast signal of a channel selected by a user, among broadcast signals transmitted in various ways, on a display. In this case, the image display apparatus may directly receive a broadcast signal, or a device such as a set-top box may receive a broadcast signal and transmit a signal corresponding to a broadcast channel selected by a user to the image display apparatus. As described above, as in Prior Art 1 (Korean Patent Publication No. 10-2016-0021538), a broadcast receiving apparatus for receiving a broadcast signal may receive a broadcast signal wirelessly through an antenna, and receive a broadcast signal by wire through a cable.

Meanwhile, a general broadcast receiving apparatus uses various information related to broadcasting service providers that transmit a broadcast signal, such as a terrestrial broadcasting station, a satellite broadcasting service provider, or a cable broadcasting service provider, for smooth search and reception of broadcast signals. For example, a satellite relays a broadcast signal transmitted by a terrestrial broadcasting station, and the broadcast receiving apparatus may receive and use a broadcast signal by using an antenna and a satellite broadcast receiving unit. Each satellite includes one or more transponders and a number of channels can be allocated to each transponder. Through this, a satellite broadcasting service provider can service various broadcasting channels by only a single satellite, and can further increase the number of serviceable broadcasting channels by using a plurality of satellites.

In this case, the broadcast receiving apparatus may receive a broadcast signal from a satellite by using information on each satellite, related to the satellite broadcasting service provider, for example, the name, frequency, polarization, symbol rate, and the like of the satellite. Similarly, the broadcast receiving apparatus may receive a broadcast signal through a cable by using information related to a cable broadcasting service provider, for example, information such as a frequency corresponding to a cable broadcasting service provider.

Meanwhile, it is common that such information on broadcasting service providers is stored in a broadcast receiving apparatus and used. However, as in the case of a change in information on broadcasting service providers, for example, when broadcasting service providers arbitrarily change the frequency of broadcast signals, or when information on broadcasting service providers is changed due to mergers or acquisitions, etc. it is essential to update information on broadcasting service providers stored in the broadcast receiving apparatus, in order for the broadcast receiving apparatus to smoothly receive a broadcast signal.

In the related art, information stored in the broadcast receiving apparatus is updated through firmware update provided by a manufacturer or provider of the broadcast receiving apparatus. However, even if only partial information is changed, there is an inconvenience of updating the entire firmware. In addition, in the case of some broadcast receiving apparatuses, a user may directly update information stored in the broadcast receiving apparatus by using information stored in an external storage medium (e.g., a USB device), which also has a problem in that the user's usability is significantly lowered.

DISCLOSURE

Technical Problem

The present disclosure has been made in view of the above problems, and provides a broadcast receiving apparatus capable of smoothly receiving a broadcast signal by easily changing information that needs to be updated, when information on broadcasting service providers transmitting a broadcast signal is changed, and an operating method thereof.

Technical Solution

In accordance with an aspect of the present disclosure, there is provided a broadcast receiving apparatus, the apparatus including: a network interface unit configured to communicate with an external server through a network; a broadcast receiving unit configured to receive a broadcast signal; a storage unit configured to store a database containing information on at least one broadcasting service provider; and a controller, wherein the controller checks whether access to the network is possible through the network interface unit, checks, when the access to the network is possible, a status of an application, which is registered in an application server, that contains information on a broadcasting service provider, through the network interface unit, determines whether it is required to update at least some of information contained in the database, based on a result of checking the status of the application, receives, when the update is required, an application containing information required for the update from the application server, updates at least some of the information contained in the database, based on the received application, and receives the broadcast signal based on the information contained in the database through the broadcast receiving unit.

Meanwhile, in accordance with another aspect of the present disclosure, there is provided a method of operating a broadcast receiving device, the method including: checking whether access to a network is possible, through a network interface unit that communicates with an external server through the network; checking, when the access to the network is possible, a status of an application, which is registered in an application server, that contains information on a broadcasting service provider, through the network interface unit, determining whether it is required to update at least some of information contained in the database containing information on at least one broadcasting service provider, based on a result of checking the status of the application, receiving, when the update is required, an application containing information required for the update from the application server, updating at least some of the information contained in the database, based on the received application, and receiving a broadcast signal based on the updated database, through a broadcast receiving unit for receiving a broadcast signal.

Advantageous Effects

The effects of the broadcast receiving apparatus and operating method thereof according to the present disclosure will be described as follows.

According to various embodiments of the present disclosure, when information on broadcasting service providers transmitting a broadcast signal is changed, the broadcasting service providers may respectively upload an application including the changed information to an application server, and the broadcast receiving apparatus downloads and installs the application registered in the application server without updating the firmware of a manufacturer or provider of the broadcast receiving apparatus. Accordingly, information that needs to be updated can be changed, so that information on broadcasting service providers can be changed more conveniently.

In addition, according to various embodiments of the present disclosure, when the broadcast receiving apparatus is connected only to the network, it is possible to automatically check whether information on broadcasting service providers needs to be updated, and whenever an update is required, information on broadcasting service providers can be changed by downloading and installing the application, thereby improving user convenience.

Further scope of applicability of the present disclosure will become apparent from the following detailed description. However, it should be understood that the detailed description and specific embodiments such as preferred embodiments of the present disclosure are given by way of example only, since various changes and modifications within the spirit and scope of the present disclosure may be clearly understood by those skilled in the art.

MODE FOR INVENTION

Figure 1A:
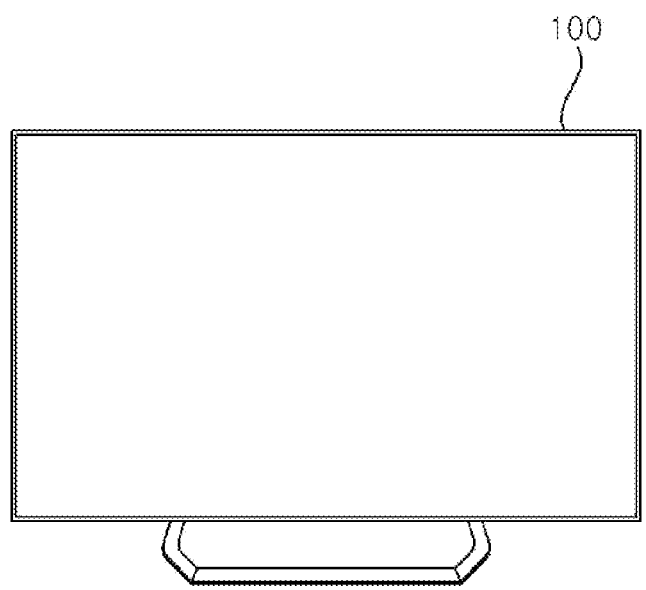
FIGS. 1A and 1B are diagrams illustrating an image display system according to various embodiments of the present disclosure.

Reference will now be made in detail to the embodiments of the present disclosure, examples of which are illustrated in the accompanying drawings. To clearly and briefly describe the present disclosure, a part without concerning to the description is omitted in the drawings, and the same or like reference numerals in the specification denote the same elements.

The suffixes "module" and "unit" of elements herein are used for convenience of description and thus may be used interchangeably and do not have any distinguishable meanings or functions. Thus, the "module" and the "unit" may be interchangeably used.

Throughout this specification, the terms such as "include" or "comprise" may be construed to denote a certain characteristic, number, step, operation, constituent element, or a combination thereof, but may not be construed to exclude the existence of or a possibility of addition of one or more other characteristics, numbers, steps, operations, constituent elements, or combinations thereof.

It will be understood that, although the terms "first", "second", "third" etc. may be used herein to describe various elements, these elements should not be limited by these terms. These terms are only used to distinguish one element from another element.

Figure 1B:
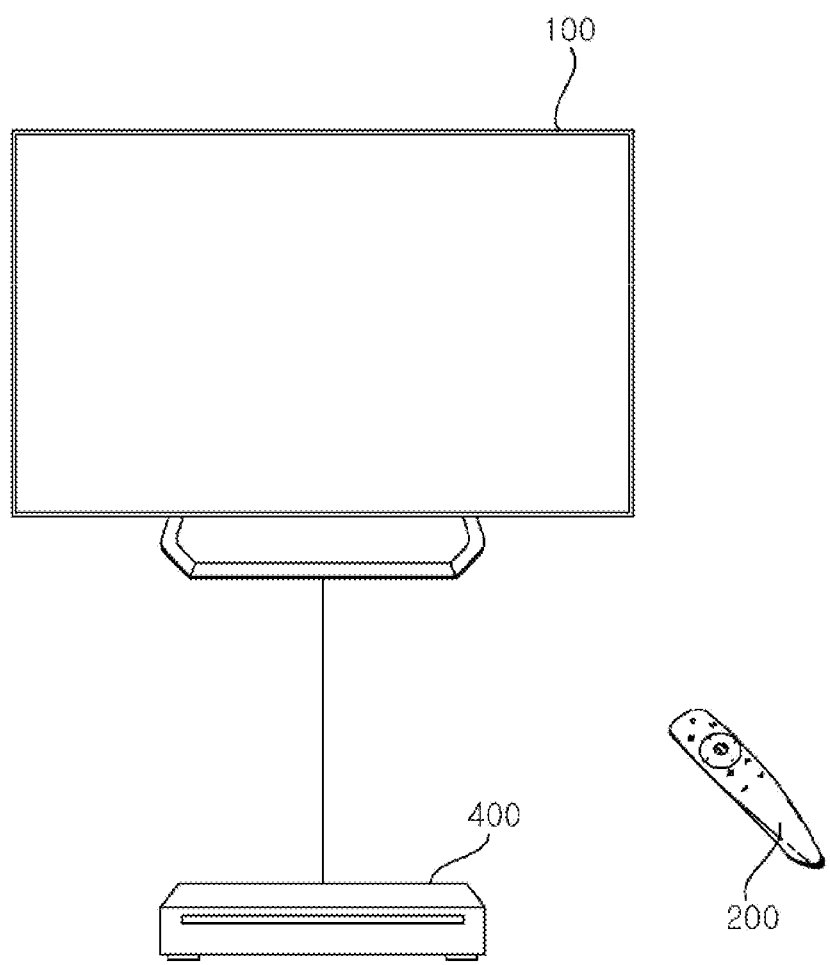

FIGS. 1A and 1B are diagrams illustrating a connection state between a broadcast receiving apparatus and an external device according to various embodiments of the present disclosure.

Referring to FIG. 1A, an image display system 10 may include an image display apparatus 100 and/or a remote control device 200.

The image display apparatus 100 may be a device that processes and outputs an image. The image display apparatus 100 is not particularly limited as long as it can output a screen corresponding to an image signal, such as a TV, a notebook computer, and a monitor.

The image display apparatus 100 may receive a broadcast signal, process it, and output a signal-processed broadcast image. When the image display apparatus 100 receives a broadcast signal, the image display apparatus 100 may correspond to a broadcast receiving apparatus.

The image display apparatus 100 may receive a broadcast signal wirelessly through an antenna, or may receive a broadcast signal by wire through a cable. For example, the image display apparatus 100 may receive a terrestrial broadcast signal, a satellite broadcast signal, a cable broadcast signal, an Internet Protocol Television (IPTV) broadcast signal, and the like.

The remote control device 200 may be connected to the image display apparatus 100 by wire and/or wirelessly to provide various control signals to the image display apparatus 100. At this time, the remote control device 200 may include a device that establishes a wired or wireless network with the image display apparatus 100, and transmits various control signals to the image display apparatus 100 through the established network, or receives a signal related to various operations processed by the image display apparatus 100 from the image display apparatus 100.

For example, various input devices such as a mouse, a keyboard, a space remote control, a trackball, and a joystick may be used as the remote control device 200. The remote control device 200 may be referred to as an external device.

Hereinafter, it should be noted in advance that an external device and a remote control device may be used interchangeably as necessary.

The image display apparatus 100 may be connected to only a single remote control device 200 or simultaneously connected to two or more remote control devices 200, thereby changing an object displayed on a screen or adjusting the state of a screen, based on a control signal provided from each remote control device 200.

Meanwhile, referring to FIG. 1B, a set-top box 400 may receive a broadcast signal, process it and transmit it to the image display apparatus 100, and the image display apparatus 100 may output an image based on the signal received from the set-top box 400. When the set-top box 400 receives a broadcast signal, the set-top box 400 may correspond to a broadcast receiving apparatus.

The set-top box 400 may receive a broadcast signal wirelessly through an antenna, or may receive a broadcast signal by wire through a cable.

The remote control device 200 may be connected to the image display apparatus 100 and/or the set-top box 400 by wire and/or wirelessly. For example, one remote control device 200 may be connected to the image display apparatus 100 and the set-top box 400, and a plurality of remote control devices 200 may be connected to the image display apparatus 100 and the set-top box 400 respectively.

Figure 2:
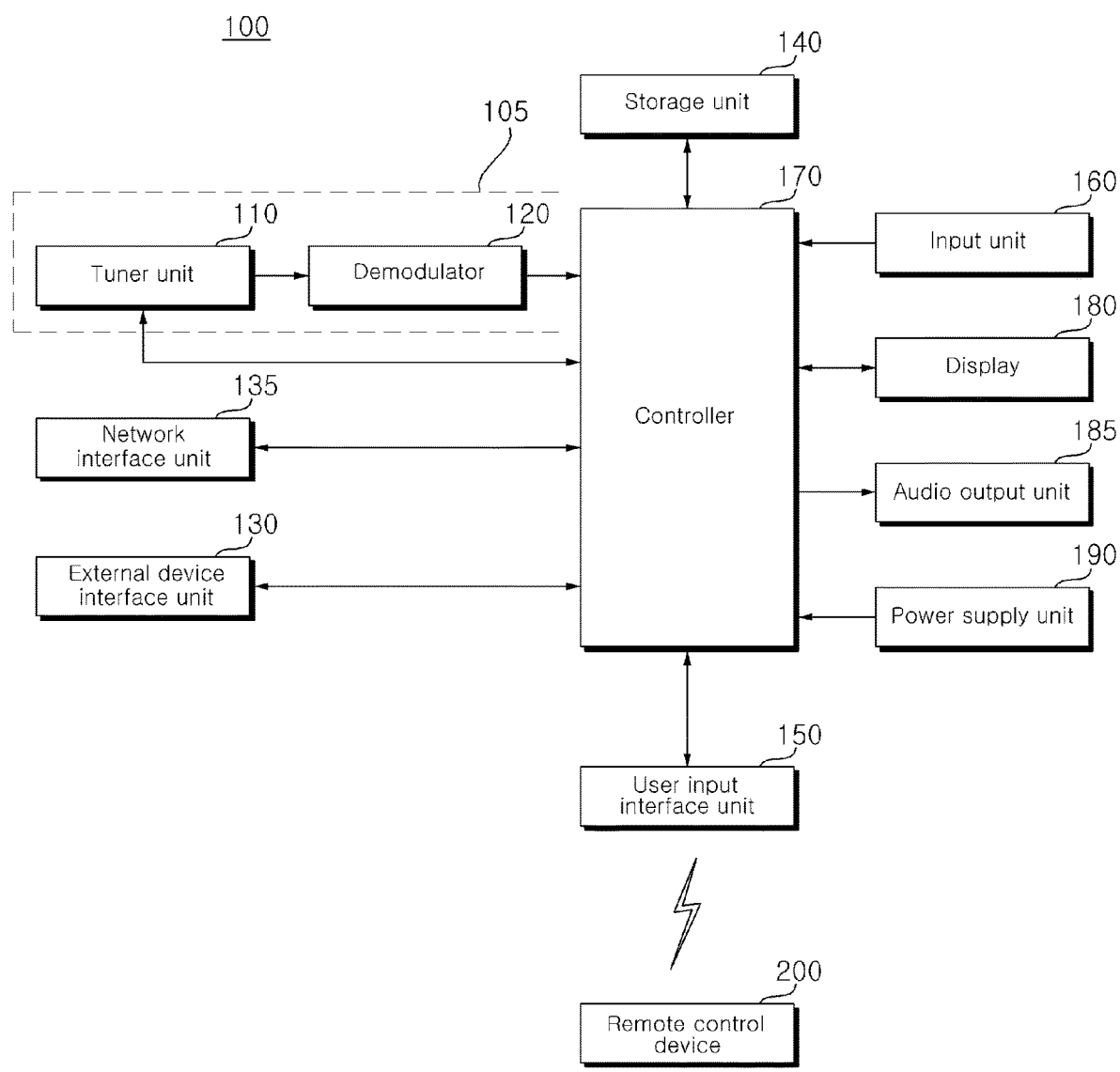
FIG. 2 is an internal block diagram of an image display apparatus of FIG. 1.

FIG. 2 is an internal block diagram of the image display apparatus of FIG. 1.

Referring to FIG. 2, the image display apparatus 100 may include a broadcast receiving unit 105, an external device interface unit 130, a network interface unit 135, a storage unit 140, a user input interface unit 150, an input unit 160, a controller 170, a display 180, an audio output unit 185, and/or a power supply unit 190.

The broadcast receiving unit 105 may include a tuner unit 110 and a demodulator 120.

The tuner unit 110 may select a broadcast signal corresponding to a channel selected by a user or all pre-stored channels, among broadcast signals received through an antenna (not shown) or a cable (not shown). The tuner unit 110 may convert the selected broadcast signal into an intermediate frequency signal, a baseband image, or a voice signal.

For example, the tuner unit 110 may convert the selected broadcast signal into a digital IF signal (DIF) when the selected broadcast signal is a digital broadcast signal, and may convert the selected broadcast signal into an analog baseband image or voice signal (CVBS/SIF) when the selected broadcast signal is an analog broadcast signal. That is, the tuner unit 110 may process a digital broadcast signal or an analog broadcast signal. The analog baseband image or voice signal (CVBS/SIF) output from the tuner unit 110 may be directly input to the controller 170.

Meanwhile, the tuner unit 110 may sequentially select broadcast signals of all broadcast channels stored through a channel storage function among the received broadcast signals, and convert them into an intermediate frequency signal, a baseband image, or a voice signal.

Meanwhile, the tuner unit 110 may include a plurality of tuners in order to receive broadcast signals of a plurality of channels. Alternatively, a single tuner that simultaneously receives broadcast signals of a plurality of channels is also possible.

The demodulator 120 may receive the digital IF signal (DIF) converted by the tuner unit 110 and perform a demodulation operation.

The demodulator 120 may output a stream signal TS after performing demodulation and channel decoding. In this case, the stream signal may be a signal obtained by multiplexing an image signal, a voice signal, or a data signal.

The stream signal output from the demodulator 120 may be input to the controller 170. After performing demultiplexing and image/voice signal processing, the controller 170 may output an image through the display 180 and output a voice through the audio output unit 185.

The external device interface unit 130 may transmit or receive data with a connected external device. To this end, the external device interface unit 130 may include an A/V input/output unit (not shown).

The external device interface unit 130 may be connected to an external device such as a Digital Versatile Disk (DVD), Blu-ray, game device, camera, camcorder, computer (laptop), and set-top box, by wire/wireless, and may perform an input/output operation with the external device.

In addition, the external device interface unit 130 may receive a control signal related to the operation of the image display device 100 from the remote control device 200, or may transmit data related to the operation of the image display apparatus 100 to the remote control device 200, by establishing a communication network with various remote control devices 200 as shown in FIG. 1.

In addition, the external device interface unit 130 may establish a communication channel with an external audio device 500 to transmit/receive data reciprocally.

The A/V input/output unit may receive image and voice signals from an external device. For example, the A/V input/output unit may include an Ethernet terminal, a USB terminal, a Composite Video Banking Sync (CVBS) terminal, a component terminal, an S-video terminal (analog), a Digital Visual Interface (DVI) terminal, a High a Definition Multimedia Interface (HDMI) terminal, a Mobile High-definition Link (MHL) terminal, a RGB terminal, a D-SUB terminal, an IEEE 1394 terminal, an SPDIF terminal, a Liquid HD terminal, and the like. A digital signal input through these terminals may be transmitted to the controller 170. In this case, the analog signal input through the CVBS terminal and the S-video terminal may be converted into a digital signal through an analog-to-digital converter (not shown) and transmitted to the controller 170.

The external device interface unit 130 may include a communication module (not shown) for short-range wireless communication with other electronic device. Through this communication module, the external device interface unit 130 may exchange data with adjacent devices.

The network interface unit 135 may provide an interface for connecting the image display apparatus 100 to a wired/wireless network including an Internet network. For example, the network interface unit 135 may communicate with a relay device, i.e. an access point AP by wire/wireless, and may access a local network through the access point AP or may access a server by using Internet.

Meanwhile, the network interface unit 135 may include a communication module (not shown) for connection with a wired/wireless network.

The external device interface unit 130 and/or the network interface unit 135 may include a communication module for short-distance communication such as Wireless Fidelity (Wi-Fi), Bluetooth, Bluetooth Low Energy (BLE), Zigbee, and Near Field Communication (NFC), a communication module for cellular communication such as long-term evolution (LTE), LTE Advance (LTE-A), code division multiple access (CDMA), wideband CDMA (WCDMA), universal mobile telecommunications system (UMTS), and Wireless Broadband (WiBro), and the like.

The network interface unit 135 may transmit or receive data with other user or other electronic device, through a connected network or other network linked to the connected network.

The network interface unit 135 may receive an update file and update information of firmware provided by a network operator, and transmit data to Internet or a content provider or a network operator.

The network interface unit 135 may access an application server (not shown) through a network, and may select and receive a desired application from among applications registered in the application server. Here, the application server may mean a server in which a broadcasting service provider can upload and register an application containing information that is an update target. For example, among the information on satellite broadcasting service provider, if the frequency and intermediate frequency used by a satellite to transmit a broadcast signal are changed, the broadcasting service provider can upload and register an application containing information on the changed frequency in the application server.

In this case, the application registered in the application server may be an application open to the public, or may also be an application that is limitedly open to a limited user, e.g., a logged-in user.

The storage unit 140 may store a program for each signal processing and control in the controller 170, or may store a signal-processed image, voice, or data signal. For example, the storage unit 140 may store application programs designed for the purpose of performing various tasks that can be processed by the controller 170, and upon request of the controller 170, may selectively provide some of the stored application programs.

The program stored in the storage unit 140 is not particularly limited as long as it can be executed by the controller 170.

The storage unit 140 may perform a function for temporarily storing an image, voice, or data signal received from an external device through the external device interface unit 130. The storage unit 140 may store information on a certain broadcast channel through a channel storage function such as a channel map. For example, the storage unit 140 may store a channel list for a certain broadcast channel.

The storage unit 140 may store a database including information on at least one broadcasting service provider. Here, the at least one broadcasting service provider may mean a target for transmitting broadcast signals, such as a terrestrial broadcasting service provider, a satellite broadcasting service provider, or a cable broadcasting service provider.

In addition, the information on the broadcasting service provider may mean setting information for receiving a broadcast signal corresponding to each broadcasting service provider. For example, the information on the terrestrial broadcasting station may include a frequency used for transmission of a terrestrial broadcasting signal. For example, the information on the satellite broadcasting service provider may include the name of a satellite, the frequency (C-band, Ku-band) used by a satellite to transmit a broadcast signal, the intermediate frequency, the polarization, the symbol rate, and the like. For example, the information on a cable broadcasting service provider may include a frequency used by each service provider to transmit a broadcast signal, information related to forward error correction (FEC), and the like.

Meanwhile, in the description according to an embodiment of the present disclosure, it is described that a database including information on at least one broadcasting service provider is stored in the broadcast receiving apparatus, but the present disclosure is not limited thereto, and the database may be stored in an external server. For example, the image display apparatus 100 may receive information on at least one broadcasting service provider from an external server, and may update a database stored in an external server.

FIG. 2 illustrates an embodiment in which the storage unit 140 is provided separately from the controller 170, but the scope of the present disclosure is not limited thereto, and the storage unit 140 may be included in the controller 170.

The storage unit 140 may include at least one of a volatile memory (e.g. DRAM, SRAM, SDRAM, etc.), a non-volatile memory (e.g. a flash memory, a hard disk drive (HDD), or a solid state drive (SSD), etc.). In various embodiments of the present disclosure, the storage unit 140 and the memory may be used interchangeably.

The user input interface unit 150 may transmit a signal input by a user to the controller 170, or may transmit a signal from the controller 170 to a user.

For example, the user input interface unit 150 may transmit/receive a user input signal such as power on/off, channel selection, and screen setting from the remote control device 200, may transmit a user input signal input from a local key (not shown) such as a power key, a channel key, a volume key, and a setting value to the controller 170, may transmit a user input signal input from a sensor unit (not shown) that senses a user's gesture to the controller 170, or may transmit a signal from the controller 170 to the sensor unit.

The input unit 160 may be provided in one side of the main body of the image display apparatus 100. For example, the input unit 160 may include a touch pad, a physical button, and the like.

The input unit 160 may receive various user commands related to the operation of the image display apparatus 100, and may transmit a control signal corresponding to the input command to the controller 170.

The input unit 160 may include at least one microphone (not shown), and may receive a voice through the microphone.

The controller 170 may include at least one processor, and may control the overall operation of the image display apparatus 100 by using the processor included therein. Here, the processor may be a general processor such as a central processing unit (CPU). Obviously, the processor may be a dedicated device such as an ASIC or other hardware-based processor.

The controller 170 may generate and output a signal for an image or voice output by demultiplexing a stream input through the tuner unit 110, the demodulator 120, the external device interface unit 130, or the network interface unit 135, or processing the demultiplexed signals.

The display 180 converts an image signal, a data signal, an OSD signal, a control signal processed by the controller 170, or an image signal, a data signal, and a control signal received from the external device interface unit 130 to generate a driving signal.

The display 180 may include a display panel (not shown) provided with a plurality of pixels.

The plurality of pixels provided in the display panel may include RGB sub-pixels. Alternatively, the plurality of pixels provided in the display panel may include a sub-pixel of RGBW. The display 180 may generate a driving signal for a plurality of pixels by converting an image signal, a data signal, an OSD signal, a control signal, etc. processed by the controller 170.

The display 180 may be a plasma display panel (PDP), a liquid crystal display (LCD), an organic light emitting diode (OLED), a flexible display, and the like, and a three-dimensional display (3D display) may be possible. The 3D display 180 may be divided into a non-glasses type and a glasses type.

Meanwhile, the display 180 may be configured as a touch screen, and used as an input device in addition to an output device.

The audio output unit 185 may include at least one speaker (not shown), and may receive a signal processed by the controller 170 to output a voice signal through at least one speaker.

The image signal processed by the controller 170 may be input to the display 180 and displayed as an image corresponding to a pertinent image signal. In addition, the image signal processed by the controller 170 may be input to an external output device through the external device interface unit 130.

The voice signal processed by the controller 170 may be outputted as an audio to the audio output unit 185. In addition, the voice signal processed by the controller 170 may be input to an external output device through the external device interface unit 130.

Although not shown in FIG. 2, the controller 170 may include a demultiplexer, an image processor, and the like. This will be described later with reference to FIG. 3.

In addition, the controller 170 may control overall operations in the image display apparatus 100. For example, the controller 170 may control the tuner unit 110 to tune a channel selected by a user or a broadcast corresponding to a pre-stored channel.

In addition, the controller 170 may control the image display apparatus 100 according to a user command input through the user input interface unit 150 or an internal program.

Meanwhile, the controller 170 may control the display 180 to display an image. In this case, the image displayed on the display 180 may be a still image or a moving image, and may be a 2D image or a 3D image.

Meanwhile, the controller 170 may enable a certain 2D object to be displayed in the image displayed on the display 180. For example, the object may be at least one of an accessed web screen (newspaper, magazine, etc.), an electronic program guide (EPG), various menus, a widget, an icon, a still image, a moving picture, and a text.

Meanwhile, the image display apparatus 100 may further include a photographing unit (not shown). The photographing unit may photograph a user. The photographing unit may be implemented with a single camera, but is not limited thereto, and may be implemented with a plurality of cameras. Meanwhile, the photographing unit may be embedded in the image display apparatus 100 in the upper portion of the display 180 or may be disposed separately. Image information photographed by the photographing unit may be input to the controller 170.

The controller 170 may recognize the location of a user, based on the image photographed by the photographing unit. For example, the controller 170 may determine the distance (z-axis coordinate) between a user and the image display apparatus 100. In addition, the controller 170 may determine the x-axis coordinates and the y-axis coordinates in the display 180 corresponding to the user's location.

The controller 170 may detect the user's gesture based on each or a combination of an image photographed by the photographing unit or a signal sensed from the sensor unit.

The power supply unit 190 may supply a corresponding power throughout the image display apparatus 100. In particular, it may supply power to the controller 170 that can be implemented in the form of a system on chip (SOC), the display 180 for displaying an image, and the audio output unit 185 for outputting audio.

Specifically, the power supply unit 190 may include a converter (not shown) that converts AC power into DC power, and a Dc/Dc converter (not shown) that converts the level of DC power.

The remote control device 200 may transmit a user input to the user input interface unit 150. To this end, the remote control device 200 may use Bluetooth, Radio Frequency (RF) communication, Infrared Radiation communication, Ultra-wideband (UWB), ZigBee method, etc. In addition, the remote control device 200 may receive an image, voice, or data signal output from the user input interface unit 150, and display it in the remote control device 200 or output as a voice.

Meanwhile, the above-described image display apparatus 100 may be a digital broadcasting receiver capable of receiving a fixed type or mobile type digital broadcasting.

Meanwhile, the block diagram of the image display apparatus 100 shown in FIG. 2 is just a block diagram for an embodiment of the present disclosure, and each component of the block diagram may be incorporated, added, or omitted according to the specifications of the image display apparatus 100 actually implemented.

That is, two or more components may be combined into a single component, or a single component may be subdivided into two or more components as needed. In addition, the function performed in each block is for explaining the embodiment of the present disclosure, and a specific operation or device does not limit the scope of the present disclosure.

Figure 3:
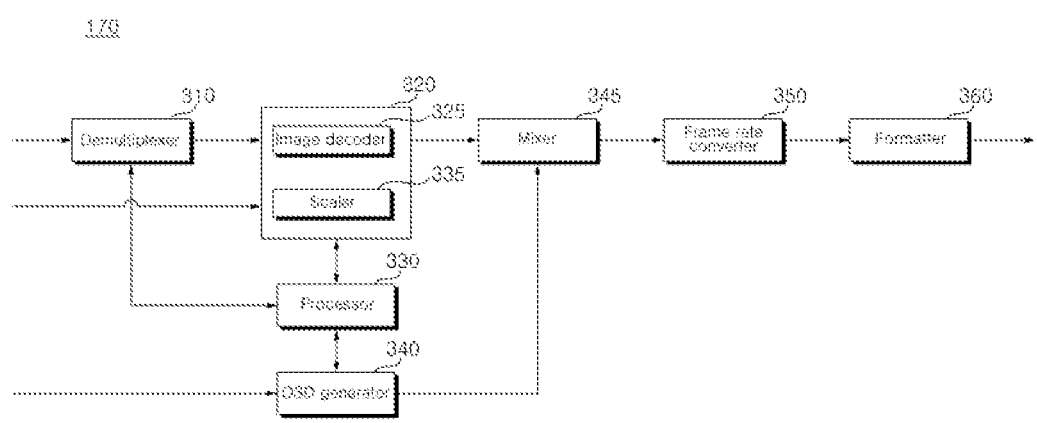
FIG. 3 is an internal block diagram of a controller of FIG. 2.

FIG. 3 is an internal block diagram of the controller of FIG. 2.

Referring to FIG. 3, the controller 170 according to an embodiment of the present disclosure may include a demultiplexer 310, an image processing unit 320, a processor 330, an OSD generator 340, a mixer 345, a frame rate converter 350, and/or a formatter 360. In addition, it may further include an audio processing unit (not shown) and a data processing unit (not shown).

The demultiplexer 310 may demultiplex an input stream. For example, when MPEG-2 TS is input, it may be demultiplexed and separated into an image, a voice, and a data signal, respectively. Here, the stream signal input to the demultiplexer 310 may be a stream signal output from the tuner unit 110, the demodulator 120, or the external device interface unit 130.

The image processing unit 320 may perform image processing of the demultiplexed image signal. To this end, the image processing unit 320 may include an image decoder 325 and a scaler 335.

The image decoder 325 may decode the demultiplexed image signal, and the scaler 335 may perform scaling of the resolution of the decoded image signal so that the image signal may be output on the display 180.

The image decoder 325 may include decoders of various standards. For example, it may include an MPEG-2, H.264 decoder, a 3D image decoder for a color image and a depth image, a decoder for a multi-view image, and the like.

The processor 330 may control overall operations in the image processing apparatus 100 or in the controller 170. For example, the processor 330 may control the tuner unit 110 to tune a channel selected by a user or a broadcast corresponding to a pre-stored channel.

In addition, the processor 330 may control the image processing apparatus 100 according to a user command input through the user input interface unit 150 or an internal program.

In addition, the processor 330 may perform data transmission control with the network interface unit 135 or the external device interface unit 130.

In addition, the processor 330 may control operation of the demultiplexer 310, the image processing unit 320, the OSD generator 340, and the like in the controller 170.

The OSD generator 340 may generate an OSD signal according to a user input or by itself. For example, the OSD generator 340 may generate a signal for displaying various types of information as a graphic or text on the screen of the display 180, based on a user input signal input through the input unit 160.

The generated OSD signal may include various data such as a user interface screen of the image processing apparatus 100, various menu screens, a widget, and an icon. In addition, the generated OSD signal may include a 2D object or a 3D object.

In addition, the OSD generator 340 may generate a pointer that can be displayed on the display 180, based on a pointing signal input from the remote control device 200.

The OSD generator 340 may include a pointing signal processing unit (not shown) that generates a pointer. The pointing signal processing unit (not shown) may be provided separately instead of being provided in the OSD generating unit 240.

The mixer 345 may mix an OSD signal generated by the OSD generator 340 and a decoded image signal image-processed by the image processing unit 320. The mixed image signal may be provided to the frame rate converter 350.

The frame rate converter (FRC) 350 may convert a frame rate of an input image. Meanwhile, the frame rate converter 350 may output intactly without a separate frame rate conversion.

The formatter 360 may dispose a left-eye image frame and a right-eye image frame of the frame rate-converted 3D image. In addition, it may output a synchronization signal Vsync for opening the left eye glass and the right eye glass of a 3D viewing apparatus (not shown).

Meanwhile, the formatter 360 may change the format of the input image signal into an image signal to be displayed on the display 180 and output it.

In addition, the formatter 360 may change the format of the 3D image signal. For example, it may change into any one of various 3D formats such as Side by Side format, Top/Down format, Frame Sequential format, Interlaced format, and Checker Box format.

Meanwhile, the formatter 360 may convert a 2D image signal into a 3D image signal. For example, according to a 3D image generation algorithm, an edge or a selectable object may be detected in a 2D image signal, and an object according to the detected edge or a selectable object may be separated and generated into a 3D image signal. In this case, as described above, the generated 3D image signal may be separated into a left-eye image signal L and a right-eye image signal R and arranged.

Meanwhile, although not shown in the drawing, it is also possible that a 3D processor (not shown) for processing a 3-dimensional effect 3D effect signal is further disposed after the formatter 360. Such a 3D processor may process brightness, tint, and color adjustment of an image signal to improve a 3D effect. For example, signal processing that makes a near field clear and a far distance blurry may be performed. Meanwhile, the functions of the 3D processor may be merged in the formatter 360 or integrated in the image processing unit 320.

Meanwhile, an audio processing unit (not shown) in the controller 170 may perform audio processing of the demultiplexed voice signal. To this end, the audio processing unit (not shown) may include various decoders.

In addition, the audio processing unit (not shown) in the controller 170 may process a base (Base), a treble, volume control, and the like.

A data processing unit (not shown) in the controller 170 may perform data processing of the demultiplexed data signal. For example, when the demultiplexed data signal is an encoded data signal, it can be decoded. The encoded data signal may be electronic program guide information including broadcast information such as start time and end time of a broadcast program aired on each channel.

Meanwhile, the block diagram of the controller 170 shown in FIG. 3 is just a block diagram for an embodiment of the present disclosure, and each component of the block diagram is integrated, added, or omitted according to the specification of the controller 170 that is actually implemented.

In particular, the frame rate converter 350 and the formatter 360 are not provided in the controller 170, but may be separately provided, or provided as a separate single module.

Figure 4:
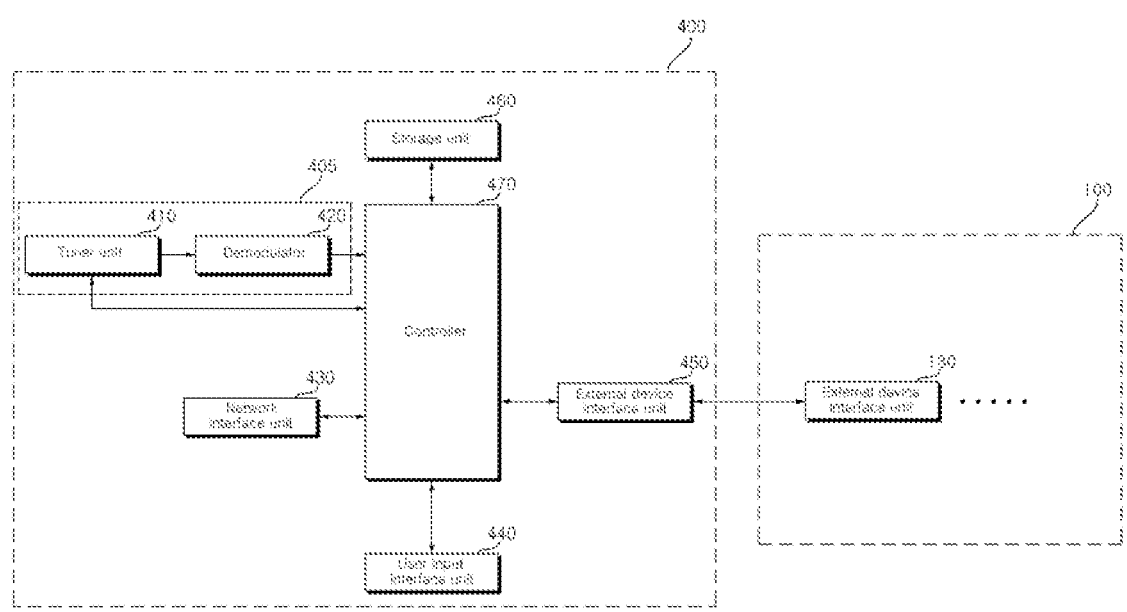
FIG. 4 is an internal block diagram of a broadcast receiving apparatus of FIG. 1B.

FIG. 4 is an internal block diagram of the broadcast receiving apparatus of FIG. 1B. A detailed description of the content overlapping with the content described in FIG. 2 will be omitted.

Referring to FIG. 4, the set-top box 400 for receiving a broadcast signal may include a broadcast receiving unit 270, an external device interface unit 265, a network interface unit 255, a storage unit 258, a user input interface unit 263, and/or a controller 260.

The broadcast receiving unit 405 may include a tuner unit 410 and a demodulator 420.

The tuner unit 410 may select a broadcast signal corresponding to a channel selected by a user or all pre-stored channels among broadcast signals received through an antenna (not shown) or a cable (not shown).

The demodulator 420 may perform a demodulation operation by receiving a digital IF signal DIF converted by the tuner unit 410, and after performing demodulation and channel decoding, may output the stream signal TS to a controller 470.

A user input interface unit 440 may transmit a signal input by a user to the controller 470, or may transmit a signal from the controller 470 to a user. For example, it may receive various control signals, such as power on/off, operation input, and setting input, that are input through a local key (not shown) or the remote control device 200, and transmit to the controller 470.

Meanwhile, the set-top box 400 may further include a media input unit (not shown) for separately playing media. As an example of such a media input unit, a Blu-ray input unit (not shown) may be exemplified. That is, the set-top box 400 may include a Blu-ray player or the like. After signal processing such as demultiplexing or decoding in the controller 470, the input media, such as Blu-ray disc, for display, may be transmitted to the image display device 100 through an external device interface unit 450.

The external device interface unit 450 may transmit or receive data to or from a connected external device. To this end, the external device interface unit 450 may include an A/V input/output unit (not shown).

The external device interface unit 450 may be connected to an external device such as an image display device (e.g. the image display apparatus 100) including a TV or a monitor, in a wired/wireless manner, and perform an input/output operation with the external device.

In addition, the external device interface unit 450 may establish a communication network with various remote control devices 200 as shown in FIG. 1B, and receive a control signal related to the operation of the set-top box 400 from the remote control device 200, or transmit data related to the operation of the set-top box 400 to the remote control device 200.

The A/V input/output unit may output image and voice signals to an external device.

The external device interface unit 450 may include a wireless communication unit (not shown) for short-range wireless communication with other electronic device.

A network interface unit 430 may provide an interface for connecting to a wired/wireless network including the Internet network. For example, the network interface unit 430 may receive content or data provided by the Internet, a content provider, or a network operator through a network.

A storage unit 460 may store a program for each signal processing and control in the controller 470, or may store a signal-processed image, voice, or data signal.

The storage unit 460 may store information on a certain broadcast channel through a channel storage function such as a channel map. For example, the storage unit 140 may store a channel list for a certain broadcast channel.

The storage unit 460 may store a database including information on at least one broadcasting service provider.

The program stored in the storage unit 460 is not particularly limited as long as it can be executed by the controller 470.

The controller 470 may perform signal processing of an input signal. For example, it may perform demultiplexing or decoding of an image signal input through the broadcast receiving unit 405, and may perform demultiplexing or decoding of an input voice signal. To this end, an image decoder or an audio decoder may be provided. The signal-processed image signal or voice signal may be transmitted to the image display apparatus 100 through the external device interface unit 450.

Figure 5:
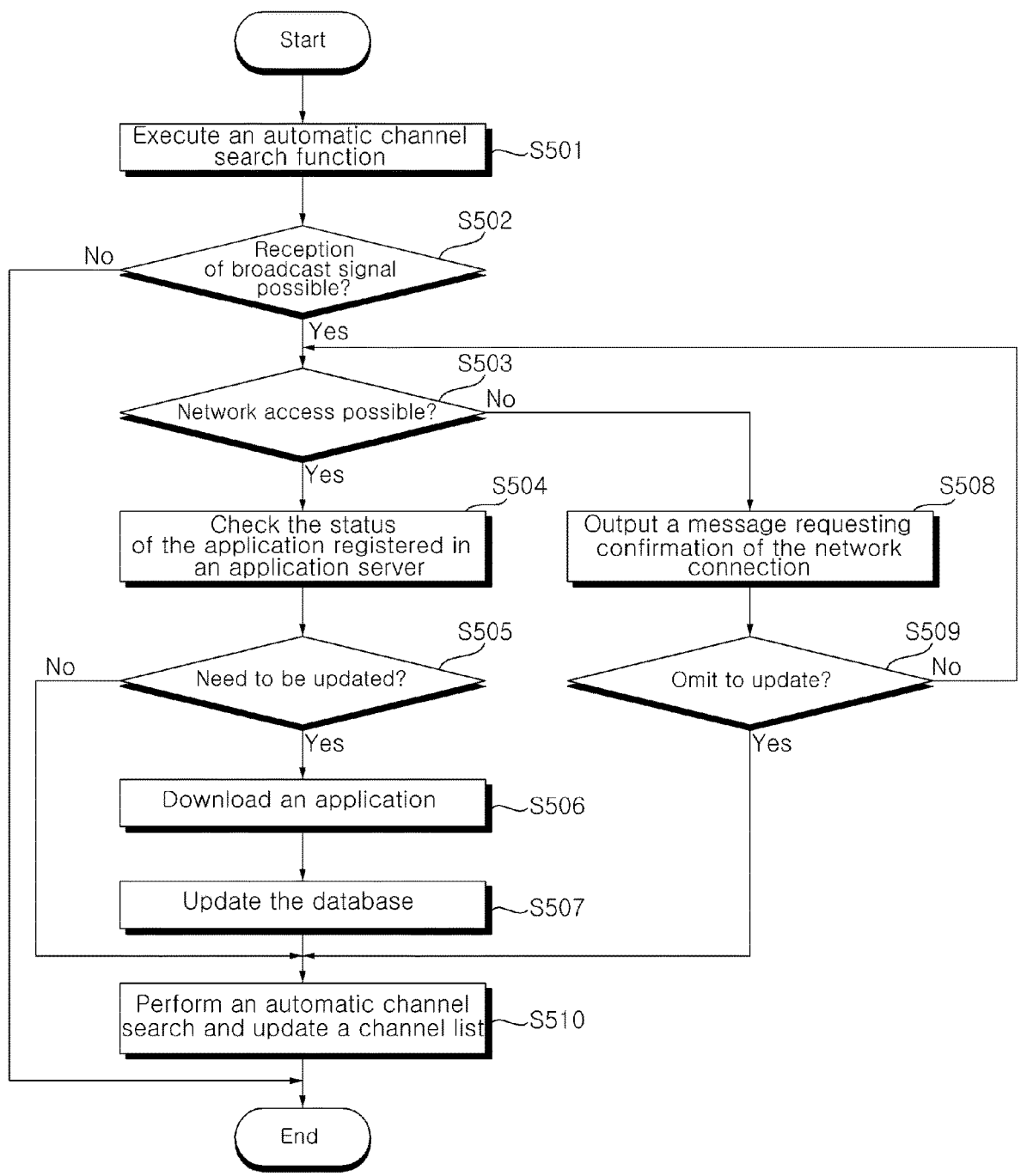
FIGS. 5 and 6 are flowcharts of a method of operating a broadcast receiving apparatus according to various embodiments of the present disclosure.

FIG. 5 is a flowchart of a method of operating a broadcast receiving apparatus according to an embodiment of the present disclosure, and is an embodiment of updating information on a broadcasting service provider in relation to the execution of an automatic channel search function. Hereinafter, it will be described that the broadcast receiving apparatus is the image display apparatus 100 as an example, but the present disclosure is not limited thereto, and it can be understood that the set-top box 400 operates in the same/similar manner.

Referring to FIG. 5, the image display apparatus 100 may execute an automatic channel search function, at operationS501.

For example, when a user input for executing an automatic channel search function is received through the remote control device 200, when the image display apparatus 100 receives a broadcast signal for the first time, and when there is no channel list for a certain broadcast channel in the storage unit 140, the image display apparatus 100 may execute an automatic channel search function.

The image display apparatus 100 may determine whether reception of a broadcast signal is possible, at operation S502. For example, the image display apparatus 100 may determine whether reception of a broadcast signal is possible by checking whether an antenna and/or a cable is connected, whether a broadcast signal is received through an antenna and/or a cable, and the like.

At operation S503, when reception of a broadcast signal is possible, the image display device 100 is connected to a wired/wireless network including the Internet network through the network interface unit 135, and may check whether access to the network is possible.

At operation S504, the image display apparatus 100 may check the status of the application registered in an application server, when being connected to a wired/wireless network including the Internet network. Here, the status of the application may include an updated version of the application, the upload time of the application, the type of updated information on the broadcasting service provider, the need of an automatic channel search operation, and the like.

For example, the image display apparatus 100 may access the application server through the network interface unit 135 to check the status of the application registered in the application server.

For example, the image display apparatus 100 may transmit a list of at least one broadcasting service provider, corresponding to the information contained in the database stored in the storage unit 140, to the application server through the network interface unit 135. In this case, the image display apparatus 100 may receive update history of application corresponding to at least one broadcasting service provider included in the list from the application server, and may check the status of the application registered in the application server based on the received update history.

At operation S505, the image display apparatus 100 may determine whether at least some of the information contained in the database stored in the storage unit 140 needs to be updated, based on the result of checking the status of the application. For example, the image display apparatus 100 may determine that an update is necessary, if the version of the application registered in the application server is newer than the version of the most recently downloaded application, in relation to a specific broadcasting service provider.

At operation S506, the image display apparatus 100 may receive, from an application server, an application containing information that needs to be updated, when at least some of the information contained in the database needs to be updated.

The image display apparatus 100 may update at least some of information contained in the database, based on the application received from the application server, at operation S507. For example, the image display apparatus 100 may install an application received from the application server, and may change at least some of information contained in the database to information contained in the application.

Meanwhile, the image display apparatus 100 may delete the application received from the application server, when the update based on the application received from the application server is completed.

Meanwhile, at operation S508, the image display apparatus 100 may output a message requesting confirmation of the network connection through the display 180, when the access to the network is not possible as it is not connected to a wired/wireless network.

The image display apparatus 100 may determine whether to omit the update of the database, at operation S509. For example, the image display apparatus 100 may output a screen for guiding the selection of whether to omit the update through the network, together with a message requesting confirmation of the network connection, and may determine whether to omit the update of the database, based on a user input inputted through the user input interface unit 150.

At this time, the update of the database is not omitted, the image display apparatus 100 may branch to operation S503 to check whether access to the network is possible.

Meanwhile, at operation S510, the image display apparatus 100 may perform an automatic channel search operation, based on information on a broadcasting service provider contained in the database, and may update a channel list for a certain broadcast channel stored in the storage unit 140.

That is, when the access to the network is possible, the image display device 100 may perform an automatic channel search operation by receiving a broadcast signal, after performing a communication with the application server through the network, and when the access to the network is impossible and the update of the database is omitted, may perform an automatic channel search operation by receiving a broadcast signal, without performing a communication with the application server through the network.

Meanwhile, the image display apparatus 100 may transmit the updated channel list to an external server (e.g., an application server, a server of a manufacturer of the image display apparatus 100). In this case, devices accessing the external server through the network may use the updated channel list stored in the external server in various ways.

Figure 6:
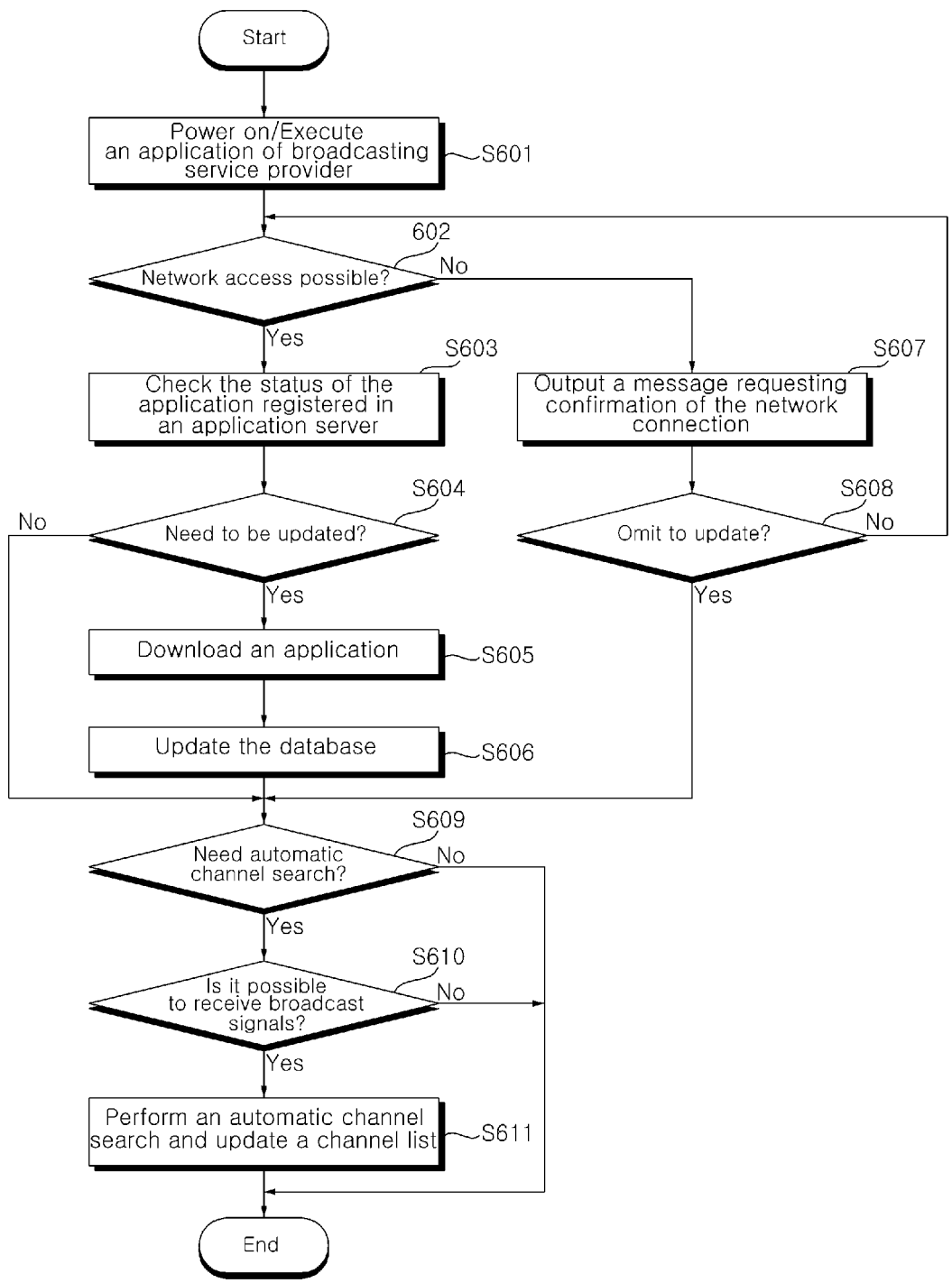

FIG. 6 is a flowchart of a method of operating a broadcast receiving apparatus according to another embodiment of the present disclosure, and is an embodiment of updating information on a broadcasting service provider in relation to a basic operation of an image display apparatus.

Referring to FIG. 6, at operation S601, the image display apparatus 100 may perform an operation related to reception of a broadcast signal according to a user input. For example, the image display apparatus 100 may turn on the power of the image display apparatus 100, or execute an application corresponding to a specific broadcasting service provider (e.g. SkyLife) according to a user input.

At operation S602, the image display apparatus 100 may be connected to a wired/wireless network including an Internet network through the network interface unit 135 to determine whether access to the network is possible.

At operation S603, when being connected to a wired/wireless network including the Internet network, the image display apparatus 100 may check the status of the application registered in the application server.

For example, when an application corresponding to a specific broadcasting service provider (e.g. SkyLife) is executed, the image display device 100 may request update history of an application corresponding to a specific broadcasting service provider (e.g. SkyLife) from an application server, and may check the status of the application registered in the application server based on the update history received from the application server.

At operation S604, the image display apparatus 100 may determine whether at least some of the information contained in the database needs to be updated, based on the result of checking the status of the application. For example, if the time when the image display apparatus 100 updates information on a specific broadcasting service provider (e.g. SkyLife) precedes the upload time of an application corresponding to a specific broadcasting service provider (e.g. SkyLife), the image display apparatus 100 may determine that an update is necessary.

At operation S605, the image display apparatus 100 may receive, from an application server, an application containing information that needs to be updated, when at least some of the information contained in the database needs to be updated.

The image display apparatus 100 may update at least some of information contained in the database, based on the application received from the application server, at operation S606. For example, the image display apparatus 100 may install an application received from the application server, and may change at least some of the information on a specific broadcasting service provider (e.g. SkyLife) contained in the database into information contained in the application.

Meanwhile, at operation S607, the image display apparatus 100 may output a message requesting confirmation of the network connection, through the display 180, when the access to the network is not possible as it is not connected to the wired/wireless network.

The image display apparatus 100 may determine whether to omit the update of the database, at operation S608. For example, the image display apparatus 100 may output a screen for guiding the selection of whether to omit the update through the network, together with a message requesting confirmation of the network connection, and may determine whether to omit the update of the database, based on a user input inputted through the user input interface 150.

In this case, if the update of the database is not omitted, the image display apparatus 100 may branch to operation S602 to check whether access to the network is possible.

Meanwhile, the image display apparatus 100 may determine whether it is necessary to perform an automatic channel search operation, at operation S609. For example, when a frequency used for transmission of a broadcast signal is changed, among information on a specific broadcasting service provider (e.g. SkyLife) contained in the database, the image display apparatus 100 determines that it is necessary to perform an automatic channel search operation.

When it is determined that it is necessary to perform an automatic channel search operation, at operation S502, the image display apparatus 100 may determine whether reception of a broadcast signal is possible. For example, the image display apparatus 100 may determine whether reception of a broadcast signal is possible, by checking whether an antenna and/or a cable is connected, whether a broadcast signal is received through an antenna and/or a cable, etc.

At operation S611, the image display apparatus 100 may perform an automatic channel search operation, based on the information on the broadcasting service provider contained in the database, and may perform a channel list for a certain broadcast channel stored in the storage unit 140.

FIGS. 7A to 8B are diagrams for explaining the operation method of the image display apparatus.

The image display apparatus 100 may output, through the display 180, a setting screen capable of changing settings related to reception and processing of a broadcast signal, based on information on a specific broadcasting service provider.

Figure 7A:
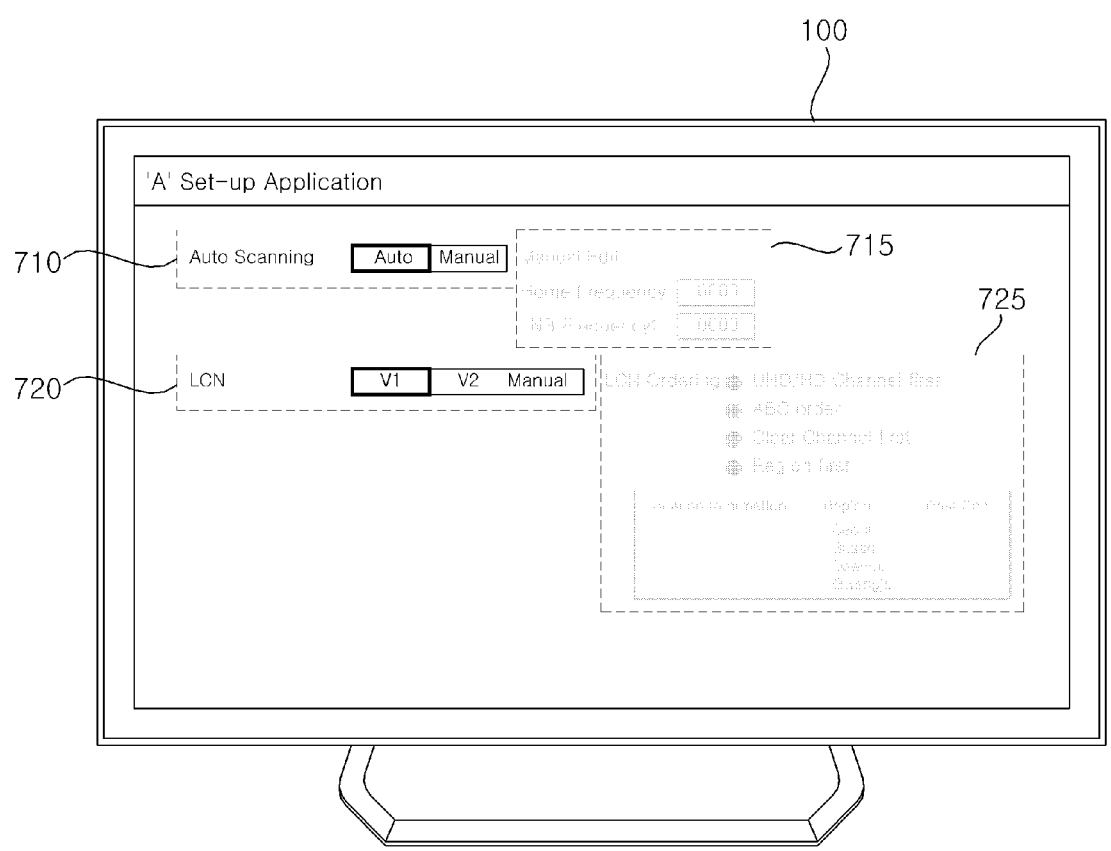
FIGS. 7A to 8B are diagrams for explaining a method of operating the image display apparatus.

Referring to FIG. 7A, a user interface (UI) 710, 720 related to a logical channel number (LCN) allocation method and a frequency setting method for an automatic channel search function may be displayed on the setting screen.

At this time, in the UI 710 for the frequency setting method, when an intermediate frequency and a local frequency are set to be automatically set when the automatic channel search function is executed, the UI 715 for manually setting the frequency is deactivated on a corresponding setting screen.

In addition, when the LCN allocation method is set to follow a preset method V1 in the UI 720 regarding the LCN allocation method, the UI 725 for manually setting the LCN allocation order in a setting screen may also be deactivated.

Figure 7B:
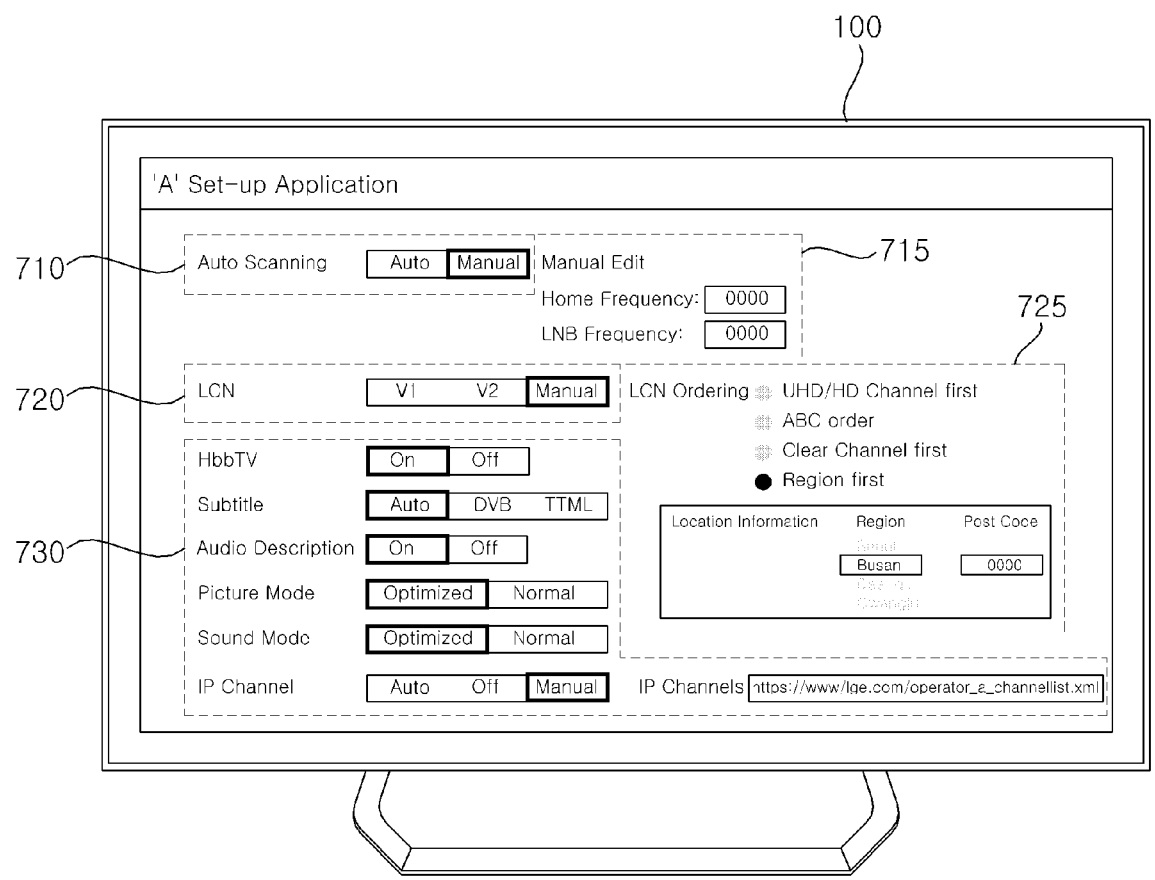

Meanwhile, referring to FIG. 7B, when the image display apparatus 100 updates information on a specific broadcasting service provider contained in the database, based on the application received from the application server, and the UI displayed on the setting screen may be changed according to the update.

For example, when a user wants to expand the allowable range of items that can be changed on the setting screen in relation to the reception and processing of broadcast signals, a specific broadcasting service provider may upload and register a new version of the application containing information on the items of the expanded allowable range into the application server. At this time, the image display device 100 may check that the new version of application is registered in the application server, and may update the database stored in the storage unit 140 by receiving a new version of application from the application server.

At this time, in comparison with FIG. 7A, as the database stored in the image display apparatus 100 is updated, a UI 730 corresponding to the update of information on a specific broadcasting service provider, such as a UI related to a Hybrid Broadcast Broadband TV (HbbTV) function, and a UI related to a subtitle format, may be additionally displayed on the setting screen.

In addition, in the UI 710 for the frequency setting method and the UI 720 for the LCN allocation method, when the setting is changed to allow a user to manually set each method, a UI 715 for manually setting a frequency and a UI 725 for manually setting an allocation order of the LCN may be activated on the setting screen.

Figure 8A:
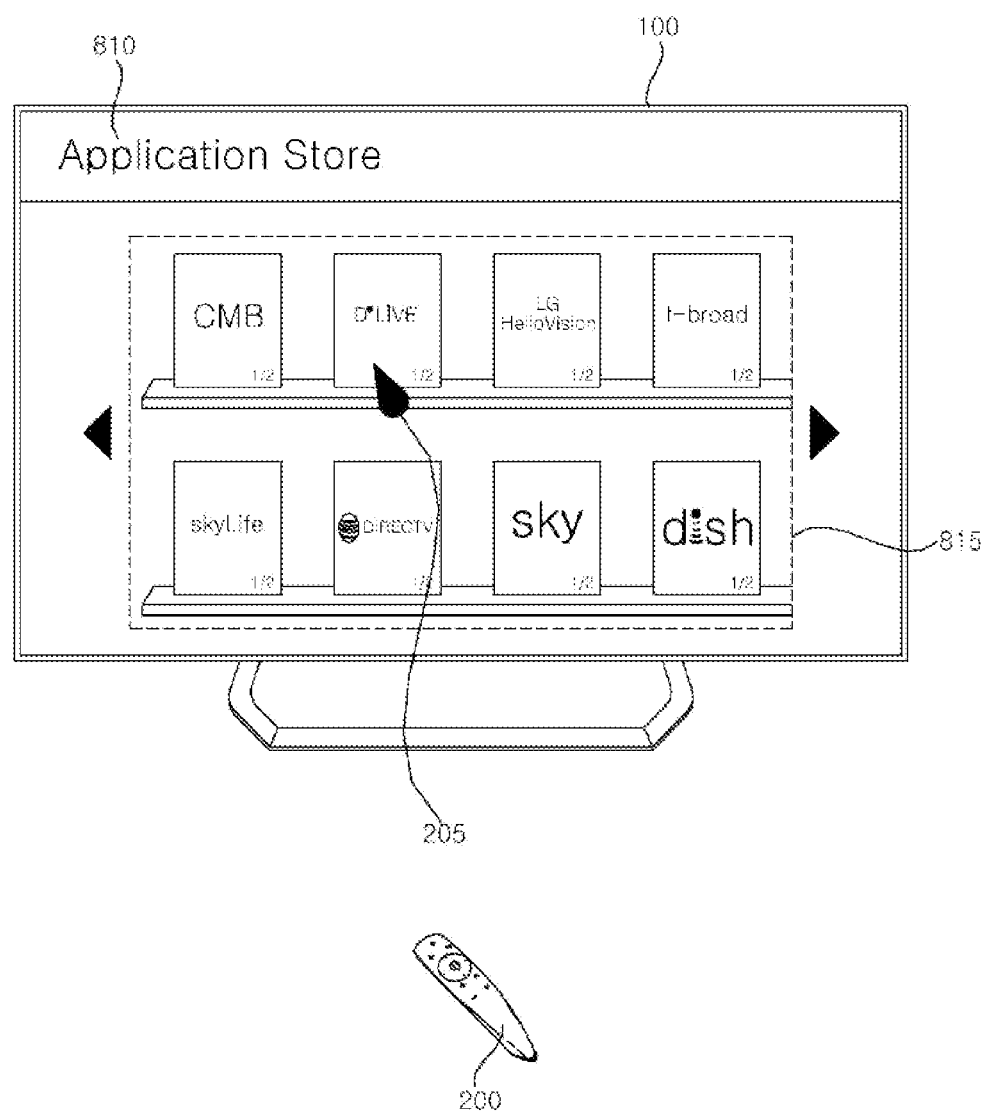

Meanwhile, referring to FIG. 8A, the image display apparatus 100 may access an application server, according to a user input, or when it is determined that at least some of the information contained in the database needs to be updated, and may output a screen 810 including an item 815 corresponding to applications registered in the application server through the display 180.

In this case, a user may select an application containing information required to be updated from among items 815 corresponding to applications registered in the application server, through the pointer 205 corresponding to the remote control device 200, and the image display device 100 may receive an application corresponding to an item selected according to a user input from the application server.

Figure 8B:
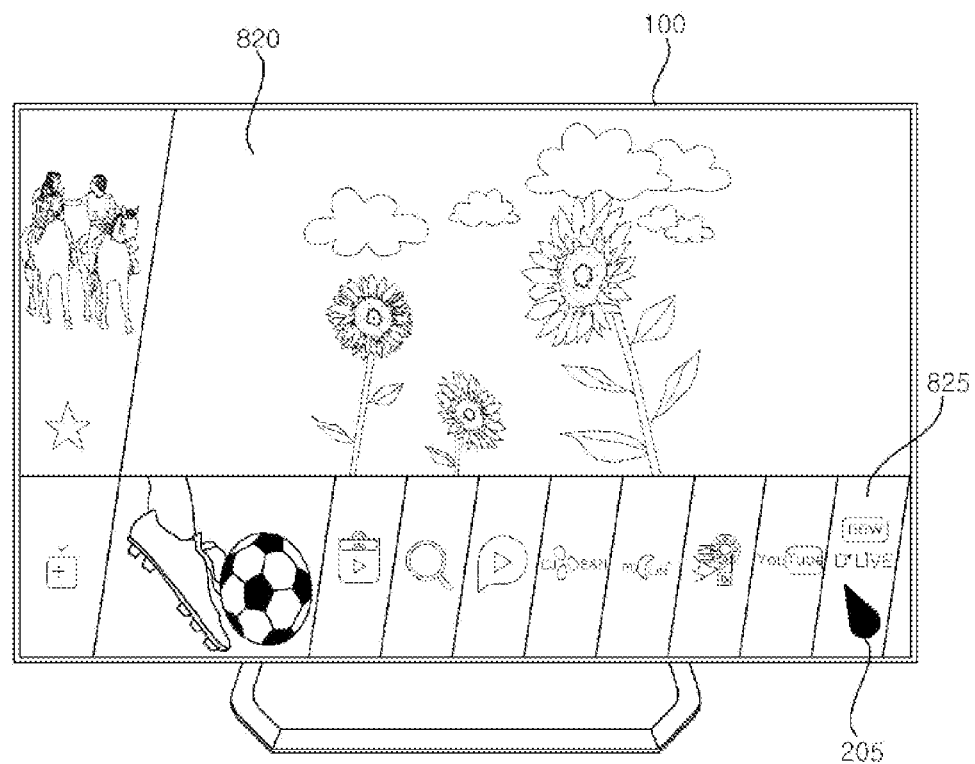
Figure 8B:
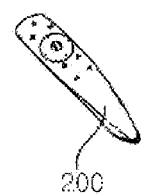

Referring to FIG. 8B, when the image display apparatus 100 receives an application from the application server, an item 825 corresponding to the received application may be included in a home screen 820 of the image display apparatus 100.

At this time, when a user selects the item 825 corresponding to the received application through the pointer 205 corresponding to the remote control device 200, the image display apparatus 100 may install the application received from the application server, and may change at least some of the information contained in the database into information contained in the application.

As described above, according to various embodiments of the present disclosure, when information on broadcasting service providers transmitting a broadcast signal is changed, the broadcasting service provider may upload an application including the changed information to an application server, and the broadcast receiving apparatus downloads and installs the application from the application server without updating the firmware of a manufacturer or provider of the broadcast receiving apparatus. Accordingly, information that needs to be updated can be changed, so that information on broadcasting service providers can be changed more conveniently.

In addition, according to various embodiments of the present disclosure, when the broadcast receiving apparatus is connected only to the network, it is possible to automatically check whether information on broadcasting service providers needs to be updated, and whenever an update is required, information on broadcasting service providers can be changed by downloading and installing the application, thereby improving user convenience.

Since the accompanying drawings are merely for easily understanding embodiments disclosed herein, it should be understood that the technical spirit disclosed herein is not limited by the accompanying drawings, and all changes, equivalents or substitutions are included in the spirit and technical scope of the present disclosure.

Meanwhile, an operation method of an image display apparatus of the present disclosure can also be embodied as a processor readable code on a recording medium readable by a processor provided in the image display apparatus. The processor-readable recording medium includes all kinds of recording apparatuses storing data that can be read by a processor. Examples of the processor-readable recording medium is ROM, RAM, CD-ROM, magnetic tapes, floppy disks, optical data storage apparatuses, and, including those that are implemented in the form of carrier waves such as data transmission through the Internet. In addition, the processor-readable recording medium is dispersed in computer systems connected through a network, so that the processor-readable code can be stored and executed in a distributed fashion.

In addition, although the present disclosure has been described with reference to specific embodiments shown in the drawings, it is apparent to those skilled in the art that the present description is not limited to those exemplary embodiments and is embodied in many forms without departing from the scope of the present disclosure, which is described in the following claims. These modifications should not be individually understood from the technical spirit or scope of the present disclosure.

The invention claimed is:

1. A broadcast receiving apparatus comprising:
 a network interface device configured to communicate with an external server through a network;
 a receiver configured to receive a broadcast signal;
 a memory configured to store a database containing information required to receive a broadcast signal corresponding to at least one broadcasting service provider; and
 a controller,
 wherein the controller:
 checks whether access to the network is possible through the network interface device,
 checks, when the access to the network is possible, a status of an application uploaded to an application server by each of broadcasting service providers, that contains information required to receive a broadcast signal corresponding to each of the broadcasting service providers, by accessing the application server through the network interface device, determines whether it is required to update at least some of information contained in the database, based on a result of checking the status of the application, receives, when the update is required, an application containing information required for the update from the application server, updates at least some of the information contained in the database, based on the received application, and receives the broadcast signal based on the information contained in the database through the receiver, wherein the status of the application comprises at least one of a version of the application and an upload time of application.

2. The broadcast receiving apparatus of claim 1, further comprising:

a display; and a user input interface device configured to receive a user input, wherein, when the access to the network is impossible, the controller output a message requesting confirmation of connection of the network through the display, and determines whether to omit the update of the database, based on the user input received through the user input interface device.

3. The broadcast receiving apparatus of claim 1, wherein, when an automatic channel search function is executed, the controller checks whether the broadcast signal is able to be received through the receiver, and checks whether the access to the network is possible when the broadcast signal is able to be received.

4. The broadcast receiving apparatus of claim 1, wherein, when the access to the network is possible, after performing communication with the application server through the network, the controller receives the broadcast signal based on the information contained in the database, and omits communication with the application server through the network, when the update of the database is omitted, and receives the broadcast signal based on the information contained in the database.

5. The broadcast receiving apparatus of claim 1, wherein, when the access to the network is possible, the controller transmits a list of the at least one broadcasting service provider, corresponding to the information contained in the database, to the application server, through the network interface device, receives an update history of an application corresponding to the at least one broadcasting service provider contained in the list from the application server, through the network interface device, and checks the status of the application uploaded to the application server, based on the received update history.

6. The broadcast receiving apparatus of claim 1, wherein, when an automatic channel search function is executed, the controller searches at least one channel according to the broadcast signal received based on the information contained in the database, generates a channel list including the searched at least one channel, and stores the generated channel list in the memory.

7. The broadcast receiving apparatus of claim 6, wherein the controller transmits the generated channel list to the application server through the network interface device.

8. A method of operating a broadcast receiving apparatus, the method comprising:

checking whether access to a network is possible, through a network interface device unit that communicates with an external server through the network;

checking, when the access to the network is possible, a status of an application, which is uploaded to an application server by each of broadcasting service providers, that contains information required to receive a broadcast signal corresponding to each of broadcasting service providers, by accessing the application server through the network interface device, determining whether it is required to update at least some of information contained in a database stored in a memory, containing information required to receive a broadcast signal corresponding to at least one broadcasting service provider, based on a result of checking the status of the application, receiving, when the update is required, an application containing information required for the update from the application server, updating at least some of the information contained in the database, based on the received application, and receiving a broadcast signal based on the updated database, through a receiver for receiving a broadcast signal, wherein the status of the application comprises at least one of a version of the application and an upload time of application.

9. The method of claim 8, further comprising:

outputting a message requesting confirmation of connection of the network through a display when the access to the network is impossible; and determining whether to omit the update of the database based on a user input received through a user input interface device.

10. The method of claim 8, further comprising checking whether the broadcast signal is able to be received through the receiver, when an automatic channel search function is executed, and wherein checking whether access to a network is possible comprises checking whether the access to the network is possible when the broadcast signal is able to be received.

11. The method of claim 8, wherein receiving a broadcast signal comprises:

receiving the broadcast signal based on the information contained in the database, after performing communication with the application server through the network, when the access to the network is possible, and omitting communication with the application server through the network, when the update of the database is omitted, and receiving the broadcast signal based on the information contained in the database.

12. The method of claim 8, wherein checking a status of an application comprises:

transmitting a list of the at least one broadcasting service provider, corresponding to the information contained in the database, to the application server, when the access to the network is possible;

receiving an update history of an application corresponding to the at least one broadcasting service provider contained in the list from the application server; and checking the status of the application uploaded to the application server, based on the received update history.

13. The method of claim 8, further comprising:

searching at least one channel according to the broadcast signal received based on the updated database, when the automatic channel search function is executed;

generating a channel list including the searched at least one channel; and storing the generated channel list in a memory of the broadcast receiving apparatus.

14. The method of claim 13, further comprising transmitting the generated channel list to the application server.

* * * * *